United States Patent
Nijhawan et al.

(10) Patent No.: US 7,694,125 B2
(45) Date of Patent: Apr. 6, 2010

(54) SYSTEM AND METHOD OF BOOTING AN OPERATING SYSTEM IN AN OPTIMAL PERFORMANCE STATE

(75) Inventors: Vijay Nijhawan, Austin, TX (US); Allen C. Wynn, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 586 days.

(21) Appl. No.: 11/565,941

(22) Filed: Dec. 1, 2006

(65) Prior Publication Data
US 2008/0133901 A1 Jun. 5, 2008

(51) Int. Cl.
*G06F 15/177* (2006.01)
(52) U.S. Cl. .................... 713/100; 713/1; 713/2
(58) Field of Classification Search .......... 713/1, 713/2, 100
See application file for complete search history.

(56) References Cited

U.S. PATENT DOCUMENTS

| | | | | |
|---|---|---|---|---|
| 6,178,503 | B1 * | 1/2001 | Madden et al. | 713/2 |
| 6,687,819 | B1 * | 2/2004 | Aguilar et al. | 713/2 |
| 6,725,330 | B1 * | 4/2004 | Wong et al. | 711/113 |
| 7,069,445 | B2 * | 6/2006 | Cheston et al. | 713/187 |
| 2004/0030874 | A1 * | 2/2004 | Qureshi et al. | 713/1 |
| 2005/0066325 | A1 * | 3/2005 | Mori et al. | 717/174 |
| 2005/0210190 | A1 * | 9/2005 | Yamada | 711/112 |
| 2006/0288197 | A1 * | 12/2006 | Swanson et al. | 713/1 |

* cited by examiner

*Primary Examiner*—Chun Cao
(74) *Attorney, Agent, or Firm*—Larson Newman & Abel, LLP

(57) ABSTRACT

A method of booting an operating system for use with an information handling system includes identifying an operating system dependent configuration, and determining an operating system type of the operating system. Further, the method includes changing the operating system dependent configuration in response to the operating system type.

19 Claims, 3 Drawing Sheets

SYSTEM AND METHOD OF BOOTING AN OPERATING SYSTEM IN AN OPTIMAL PERFORMANCE STATE

FIELD OF THE DISCLOSURE

This disclosure relates generally to information handling systems, and more particularly to a system and method of booting an operating system in an optimal performance state.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most computer systems include a basic input output system (BIOS) that provides an interface between the operating system kernel and the underlying hardware. The kernel is the portion of the operating system that is closest to the application system. The kernel is responsible, typically, for process control, memory management, file management, and peripheral support. The BIOS provides boot services and run time services to the operating system. Examples of run time services are interrupts, ACPI, SMBIOS, and power management.

BIOS is firmware for a computer, such as a personal computer (PC) or a server, that is responsible for initializing when it is first switched on or reset. The major task of the BIOS is to load and begin execution of the operating system that is normally stored on the computer's hard disk. The BIOS also provides a low level interface to the peripheral devices of the computer system. The BIOS is stored in a non-volatile memory that can be updated, or in a read-only memory (ROM).

A BIOS configuration can store parameters that affect the operation of the computer. For example, the BIOS configuration can include the boot order of storage devices. Additionally, some parameters can affect the performance of the operating system. The PC can have a feature or mode of operation that is not supported by the operating system and the feature can be disabled. However, another operating system may support the feature and realize a performance benefit when the feature is enabled. A default value can be chosen for the configuration and, depending on the operating system selected by a user, the default value may either improve or adversely affect performance of the computer. Often, the user is not aware of the feature or does not know how the feature will affect performance. Additionally, the user can change the operating system, or the operating system can be updated to support the feature, and the user can be unaware that the configuration should change.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
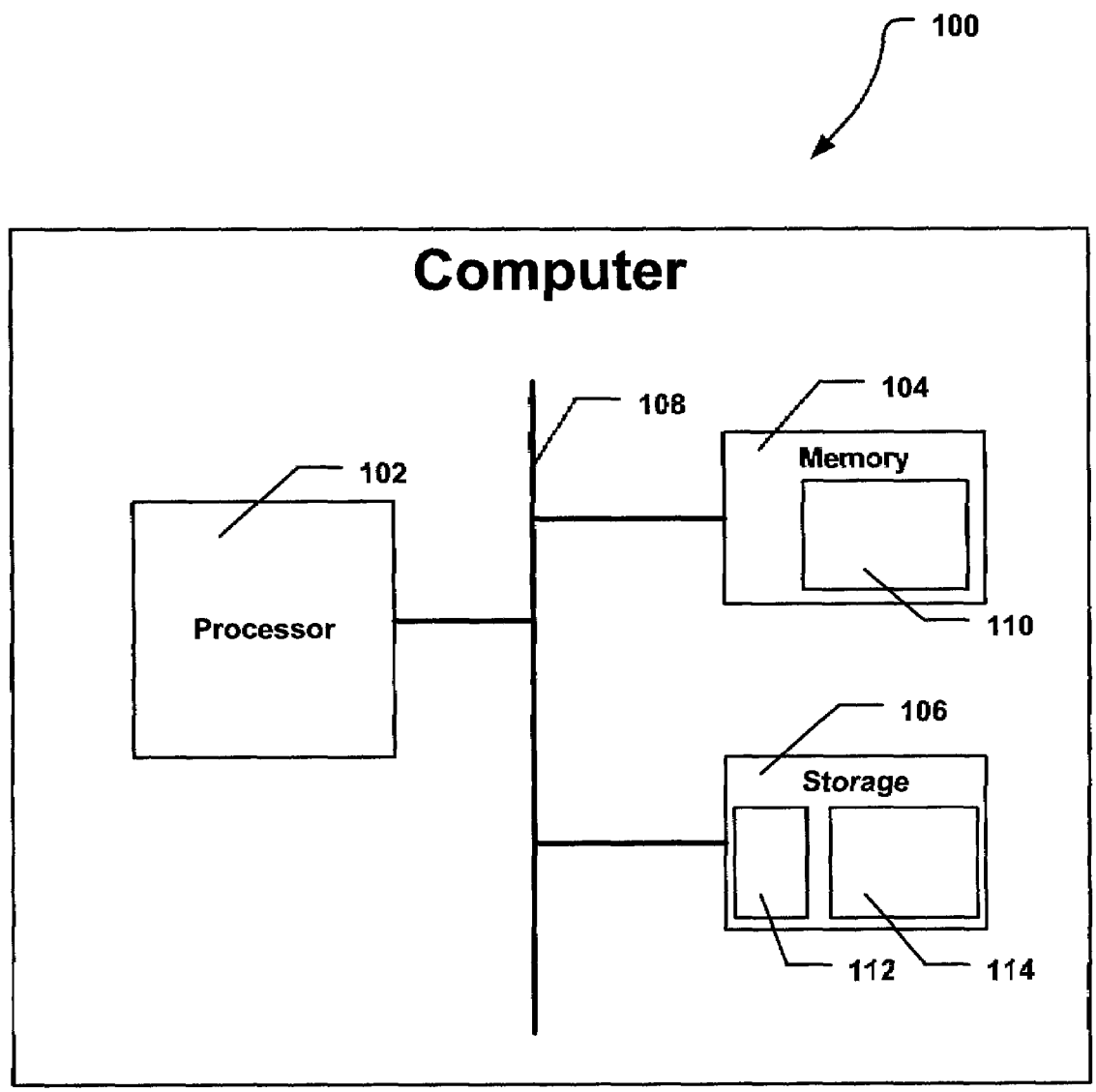
FIG. 1 is a block diagram of an information handling system.

FIG. 1 shows an information handling system generally designated 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

In an exemplary embodiment, the information handling system comprises a processor 102, a memory 104, and storage 106. A bus 108 operationally connects the processor 102, the memory 104, and the storage 106. The memory 104 includes a set of basic input output system (BIOS) instructions 110. In an exemplary embodiment, the processor 102 executes the set of BIOS instructions 110. A storage 106 includes a master boot record (MBR) 112 and an active partition 114. The MBR 112 includes the partition table of the storage 106 and indicates the physical location of the active partition 114. The MBR 112 includes code that, when executed by the BIOS, passes control to the volume boot record of the active partition, which loads and executes the operating system. The active partition 114 is a formatted file system. The file system can be, but is not limited to, FAT, an extended file system such as ext2 or ext3, NTFS, or another commonly used file system.

Figure 2:
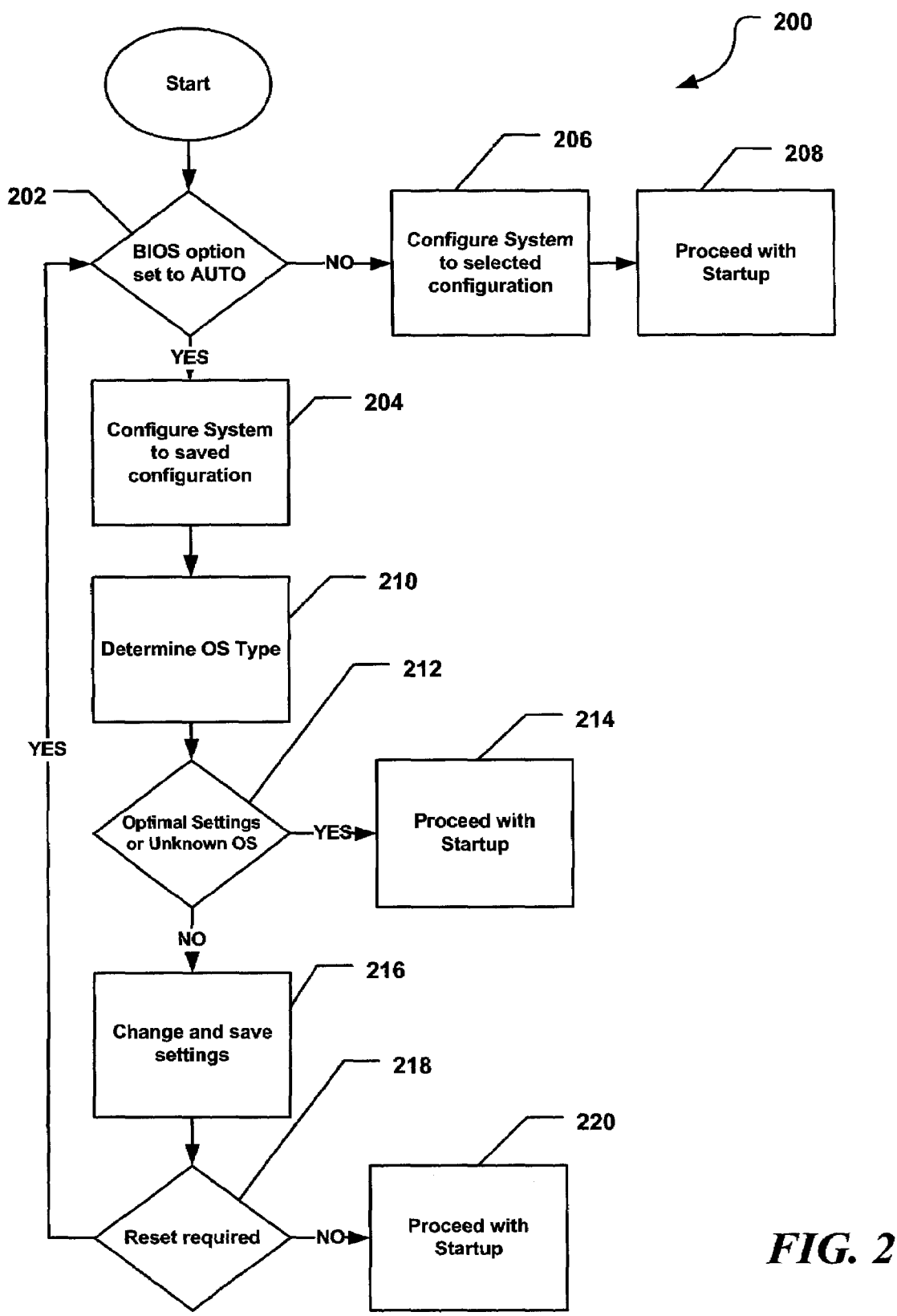
FIG. 2 is a flow diagram illustrating a method of booting an operating system in an optimal performance state.

FIG. 2 shows a flow diagram illustrating a method of booting an operating system, generally designated 200. Illustrated at 202, the BIOS determines if a BIOS option is set to AUTO. As described in more detail below, if the BIOS determine the BIOS option is set to AUTO, the BIOS proceeds to 204; otherwise the BIOS proceeds to 206. A BIOS option can be set to AUTO if the BIOS option releates to an operating system dependant configuration. The operating system dependant configuration controls a function of the information handling system that affects the performance of a first operating system differently than the performance of a second operating system.

In an exemplary embodiment, the information handling system is a non-uniform memory access (NUMA) system. The NUMA system has a first processor and a second processor, each processor having a memory associated with the processor. The first processor accesses the memory associated with the first processor (local memory) in less time than it takes to access the memory associated with the second processor (remote memory). In an exemplary embodiment, the first operating system is configured to allocate resources to take advantage of local memory and avoid the performance penalty of using remote memory. The second operating system is not be optimized for NUMA and performs better if the memory is interleaved. Interleaved memory spreads addresses across multiple memory modules, such that consecutive addresses are located on different memory modules. The operating system dependant configuration switches the system from a NUMA state to the interleaved state. The NUMA state improves performance of the first operating system while degrading performance of the second operating system. Alternatively, the interleaved state improves performance of the second operating system while degrading performance of the second operating system.

In an exemplary embodiment, the BIOS determines the BIOS option is not set to AUTO. The BIOS configures the system to the selected configuration, as shown in 206. The BIOS proceeds with the start up of the first operating system, as illustrated in 208.

In an alternative embodiment, the BIOS determines the configuration is set to AUTO. The BIOS configures the system using a saved configuration stored in a nonvolatile BIOS memory, as shown in 204. The saved configuration represents a selection based on a previous operating system. The BIOS determines an operating system type, as illustrated at 210.

In an exemplary embodiment, the BIOS checks a master boot record (MBR) of an active partition. If the MBR matches a known MBR signature, then the operating system type can be substantially determined. For example, a Linux operating system can have a LILO MBR signature, wherein the string "LILO" is at offset 6 of the MBR. In another example, the MBR for a Windows 2000 operating system or a Windows XP operating system can contain an OEM ID string equal to "NTFS" at MBR offset 3.

In another embodiment, the BIOS checks a partition ID of the active partition to determine the operating system type. For example, a partition ID of 83 indicates the partition is a Linux native partition and the operating system is a Linux operating system. Alternatively, a partition ID of 07 indicates the partition is a NTFS partition and the operating system can be a Windows XP operating system or a Windows 2000 operating system.

In yet another embodiment, the BIOS checks the nonvolatile BIOS memory for a stored operating system type, the stored operating system type having been determined for a previous operating system. The nonvolatile BIOS memory contains an operating system type if the BIOS wrote the operating system type to the nonvolatile BIOS memory during a previous use of the information handling system, as described below.

In an exemplary embodiment, the BIOS communicates with an operating system after it has started to determine the operating system type. An advanced configuration and power management (ACPI) standard defines a method for the communication between the BIOS and the operating system. In an exemplary embodiment, the operating system defines an operating system interfaces (OSI) string representing a set of operating system interfaces and behaviors. The BIOS uses a _OSI method to retrieve the string and determine the operating system type based on the operating system interfaces and behaviors. In an additional embodiment, the operating system defines an operating system (OS) string representing a name of the operating system. The BIOS uses a _OS method to retrieve the string and determine the operating system type based on the name of the operating system. The BIOS stores the operating system type in the nonvolatile BIOS memory.

As illustrated at 212, the BIOS checks if the current configuration is optimal for the operating system type or if the operating system is unknown. The operating system type is unknown if the operating system type is undetermined at 210, or if the BIOS cannot determine the optimal configuration for the operating system type. If the current configuration is optimal, the BIOS proceeds with the startup of the first operating system, as illustrated at 214. Additionally, if the operating system type is unknown, the BIOS proceeds with the startup of the first operating system, as illustrated at 214. Otherwise, if the operating system type is known, the BIOS changes the settings of the system to match the optimal settings of the operating system type, as illustrated in 216. Additionally, the BIOS writes the settings to the saved configuration. The BIOS determine if a reset of the system is required to affect the change in settings, as shown in 218. If a reset is required, the BIOS resets the system and returns to 202. Otherwise, the BIOS proceeds with startup of the first operating system, shown in 220.

Figure 3:
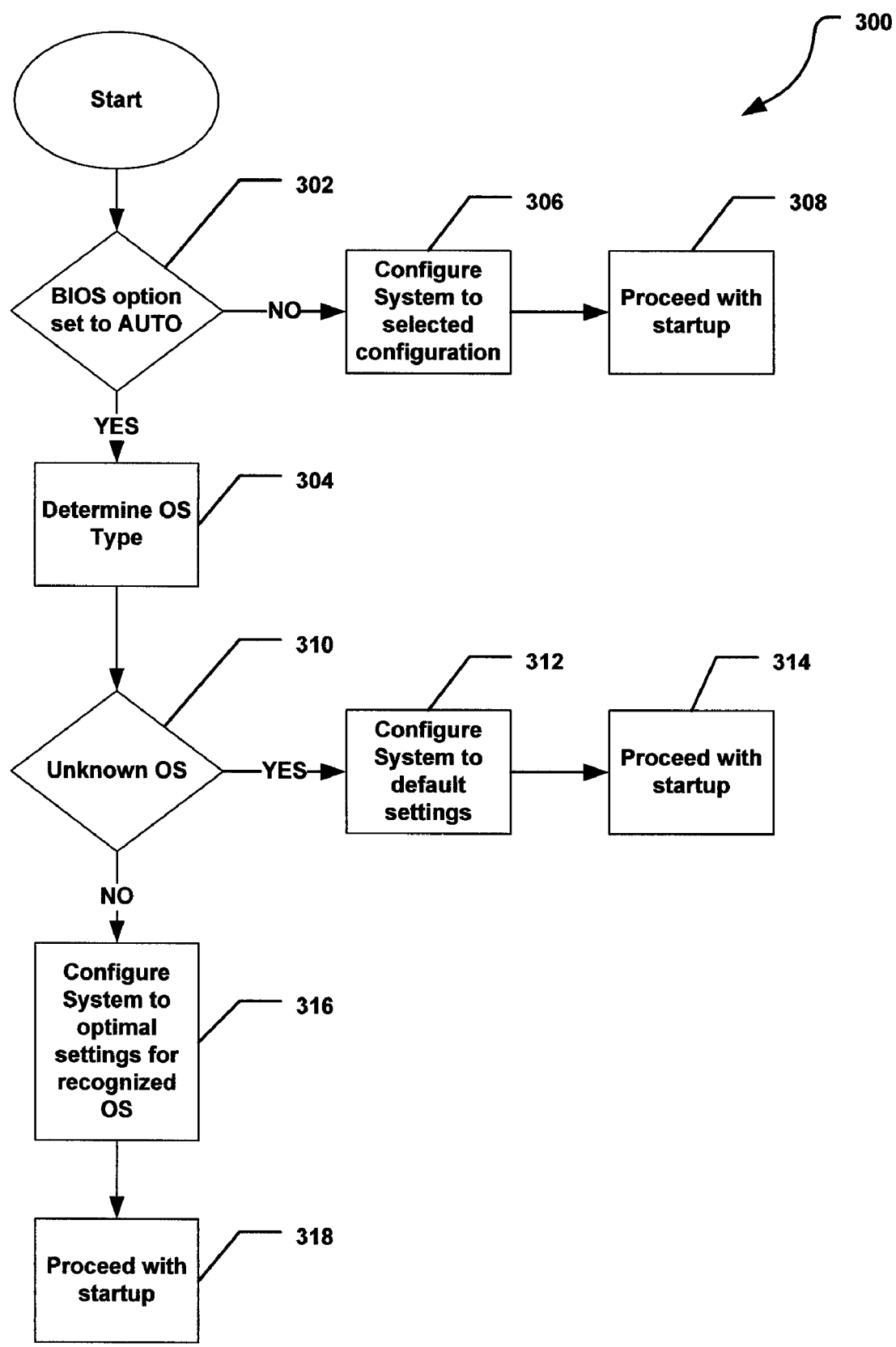
FIG. 3 is a flow diagram illustrating an alternate method of booting an operating system in an optimal performance state.

FIG. 3 shows a flow diagram illustrating an alternate method of booting an operating system generally designated 300. Illustrated at 302, the BIOS determines if a BIOS option is set to AUTO. As described in more detail below, if the BIOS determines the BIOS option is set to AUTO, the BIOS proceeds to 304; otherwise the BIOS proceeds to 306. A BIOS option can be set to AUTO if the BIOS option relates to an operating system dependant configuration. The operating system dependant configuration controls a function of the information handling system that affects the performance of a first operating system differently than the performance of a second operating system.

In an exemplary embodiment, the BIOS determines the BIOS option is not set to AUTO. The BIOS configures the system to the selected configuration, as shown in 306. The BIOS proceeds with the start up of the first operating system, as illustrated in 308.

In an alternative embodiment, the BIOS determines the BIOS option is set to AUTO. Illustrated at 304, the BIOS determines an operating system type as previously described.

As illustrated at 310, the BIOS checks if the operating system is unknown. The operating system type is unknown if the operating system type is undetermined at 304, or if the BIOS cannot determine the optimal configuration for the operating system type. If the operating system type is unknown, the BIOS configures the system to the default settings, as shown at 312. The BIOS proceeds with the startup of the first operating system, as illustrated at 314. If the operating system type is known, the BIOS changes the settings of the system to match the optimal settings for the operating system type, as illustrated in 316. Shown in 318, the BIOS proceeds with startup of the first operating system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of booting an operating system for use with an information handling system, the method comprising the steps of:
    determining whether a basic input output system (BIOS) option is set to automatic;
    if the BIOS option is set to automatic:
        identifying an operating system dependent configuration;
        determining an operating system type;
        changing the operating system dependent configuration in a memory of the information handling system in response to the operating system type; and
        booting the operating system; and
    otherwise:
        configuring the operating system dependent configuration to a selected configuration; and
        booting the operating system.

2. The method of claim 1 wherein determining the operating system type includes comparing a master boot record (MBR) to an MBR signature.

3. The method of claim 1 wherein determining the operating system type includes identifying a file system type.

4. The method of claim 1 wherein determining the operating system type includes determining the operating system type of an operating system running on the information handling system, writing the operating system type to a nonvolatile BIOS memory, and reading the operating system type from the nonvolatile BIOS memory.

5. The method of claim 4 wherein determining the operating system type includes using one of an advanced configuration and power management (ACPI)_OSI method, an ACPI_OS method, or a combination thereof.

6. The method of claim 1 further comprising reading the operating system dependant configuration from a nonvolatile BIOS memory and writing the operating system dependant configuration to the nonvolatile BIOS memory.

7. A memory associated with an information handling system, the memory comprising:
    a BIOS that includes BIOS code that:
        determines whether a BIOS option is set to automatic;
        if the BIOS option is set to automatic, the BIOS code:
            identifies an operating system dependent configuration;
            determines an operating system type;
            changes the operating system dependent configuration in response to the operating system type; and
            boots the operating system; and
        otherwise, the BIOS code:
            configures the operating system dependent configuration to a selected configuration; and
            boots the operating system.

8. The memory of claim 7 wherein the BIOS code compares an MBR to an MBR signature to determine the operating system type.

9. The memory of claim 7 wherein the BIOS code identifies a file system type to determine the operating system type.

10. The memory of claim 7 wherein the BIOS code detects an operating system running on the information handling system to determine the operating system type, writes the operating system type to a nonvolatile BIOS memory, and reads the operating system type from a nonvolatile BIOS memory.

11. The memory of claim 10 wherein the BIOS code uses one of an ACPI_OSI method, an ACPI_OS method, or a combination thereof to detect the operating system running on the information handling system.

12. The memory of claim 7 wherein the BIOS code reads the operating system dependent configuration from a nonvolatile BIOS memory and writes the operating system dependent configuration to the nonvolatile BIOS memory.

13. The memory of claim 12 wherein the BIOS code resets the information handling system.

14. An information handling system, the system comprising:
    a processor;
    a memory operably coupled to the processor, wherein the memory stores instructions that, when executed by the processor, cause the processor to:
        determine whether a BIOS option is set to automatic;
        if the BIOS option is set to automatic, cause the processor to:
            identify an operating system dependent configuration;
            compare a master boot record (MBR) to an MBR signature to determine an operating system type;
            change the operating system dependent configuration in response to the operating system type; and
            boot the operating system; and
        otherwise, cause the processor to:
            configure the operating system dependent configuration to a selected configuration; and
            boot the operating system.

15. The information handling system of claim 14 wherein the processor identifies a file system type to determine the operating system type.

16. The information handling system of claim 14 wherein the processor detects the operating system type of an operating system running on the information handling system, writes the operating system type to the nonvolatile BIOS memory, and reads the operating system type from the nonvolatile BIOS memory.

17. The information handling system of claim 16 wherein the processor uses one of an ACPI_OSI method, an ACPI_OS method, or a combination thereof to detect the operating system running on the information handling system.

18. The information handling system of claim 14 further comprising a nonvolatile BIOS memory, wherein the processor reads the operating system dependent configuration from the nonvolatile BIOS memory and writes the operating system dependent configuration to the nonvolatile BIOS memory.

19. The information handling system of claim 18 wherein the processor resets the information handling system.

* * * * *